(12) United States Patent  
Matsumoto

(10) Patent No.: US 8,837,019 B2  
(45) Date of Patent: Sep. 16, 2014

(54) SHEET CONVEYING APPARATUS, IMAGE READING APPARATUS, AND IMAGE FORMING APPARATUS

(71) Applicant: Canon Kabushiki Kaisha, Tokyo (JP)

(72) Inventor: Akira Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/795,457

(22) Filed: Mar. 12, 2013

(65) Prior Publication Data  
US 2013/0265620 A1 Oct. 10, 2013

(30) Foreign Application Priority Data  
Apr. 4, 2012 (JP) ................................. 2012-085260

(51) Int. Cl.  
*H04N 1/04* (2006.01)  
*H04N 1/00* (2006.01)

(52) U.S. Cl.  
CPC ................................. *H04N 1/00615* (2013.01)  
USPC ............ 358/498; 358/496; 358/401; 358/474

(58) Field of Classification Search  
USPC .................................. 358/498, 496, 401, 474  
See application file for complete search history.

(56) References Cited

U.S. PATENT DOCUMENTS

| | | | | |
|---|---|---|---|---|
| 6,648,320 | B2 * | 11/2003 | Iino et al. ..................... | 271/3.15 |
| 7,623,277 | B2 * | 11/2009 | Wang et al. ................... | 358/498 |
| 8,102,578 | B2 * | 1/2012 | Oh ................................ | 358/498 |
| 2008/0193181 | A1 * | 8/2008 | Jeong et al. ................... | 399/401 |

FOREIGN PATENT DOCUMENTS

| | | |
|---|---|---|
| JP | 11-059957 A | 3/1999 |
| JP | 2000-318873 A | 11/2000 |
| JP | 2011-032040 A | 2/2011 |

* cited by examiner

*Primary Examiner* — Houshang Safaipour  
(74) *Attorney, Agent, or Firm* — Fitzpatrick, Cella, Harper & Scinto

(57) ABSTRACT

A sheet conveying apparatus comprising: a first conveying guide; a second conveying guide which is arranged on a downstream of the first conveying guide; a plurality of first convex portions which is provided in the first conveying guide, extends toward the second conveying guide and is arranged in a sheet width direction; a plurality of second convex portions which is provided in the second conveying guide, extends toward the first conveying guide and is arranged in the sheet width direction, wherein the first convex portions and the second convex portions are alternately arranged in the sheet width direction; and a bent portion which is formed between the plurality of second convex portions in the second conveying guide, and bent in a manner such that an upstream end is arranged at a position farther from the sheet conveying path than a downstream end portions of the first convex portions.

15 Claims, 8 Drawing Sheets

SHEET CONVEYING APPARATUS, IMAGE READING APPARATUS, AND IMAGE FORMING APPARATUS

BACKGROUND OF THE INVENTION

1. Field of the Invention

The present invention relates to a sheet conveying apparatus which has a first conveying guide which conveys a sheet and a second conveying guide which is arranged closer to a downstream side in a sheet conveying direction than the first conveying guide and conveys a sheet, an image reading apparatus therewith, and an image forming apparatus therewith.

2. Description of the Related Art

Conventionally, to apply various processes to the sheet, an image forming apparatus has inside an image forming apparatus body a sheet conveying mechanism which conveys a sheet. During this process of conveying the sheet, there is a problem that a phenomenon (so-called jam) occurs that the sheet jams. When jam occurs, a conveying guide which forms a sheet conveying path is opened and closed to expose the sheet conveying path and allow a user to remove the jammed sheet.

To provide an opening/closing mechanism to the above conveying guide, the conveying guide is formed with a plurality of conveying guides and comb shapes are used to a seam site of the conveying guides (Japanese Patent Laid-Open No. 2011-32040).

However, in the invention disclosed in Japanese Patent Laid-Open No. 2011-32040, when a sheet passes between comb conveying guides, a front end of the sheet contacts an upstream end of the conveying guide located on a downstream side in a conveying direction (between a convex portions) and damage such as a scratch may be left on the front end of the sheet. Further, when the above comb conveying guides are provided closer to the downstream in the sheet conveying direction than an image reading portion, a shock caused when a sheet front end contacts the combs may cause image deterioration such as a read image which is out of color registration. Furthermore, when a lateral end of a sheet contacts the combs, the sheet which is being conveyed may be skew fed and sheet conveying performance may decrease.

SUMMARY OF THE INVENTION

In light of the above problem, it is desirable to provide a sheet conveying apparatus which conveys a sheet while reducing damage on the sheet.

A sheet conveying apparatus comprising: a first conveying guide which guides a sheet; a second conveying guide which is arranged on a downstream of the first conveying guide in a sheet conveying direction, guides the sheet and forms a sheet conveying path together with the first conveying guide; a plurality of first convex portions which is provided in the first conveying guide, extends toward the second conveying guide and is arranged in a sheet width direction crossing to the sheet conveying direction; a plurality of second convex portions which is provided in the second conveying guide, extends toward the first conveying guide and is arranged in the sheet width direction, wherein the first convex portions and the second convex portions are alternately arranged in the sheet width direction; and a bent portion which is formed between the plurality of second convex portions in the second conveying guide, and bent in a manner such that an upstream end of the bent portion is arranged at a position farther from the sheet conveying path than a downstream end portions of the first convex portions.

Further features of the present invention will become apparent from the following description of exemplary embodiments with reference to the attached drawings.

DESCRIPTION OF THE EMBODIMENTS

Hereinafter, an exemplary mode for implementing the present invention will be described in detail based on an embodiment with reference to the drawings. However, such as the dimensions, materials, shapes and relative positions of components disclosed in this embodiment are adequately changed according to a configuration of a device to which the present invention is applied or various conditions, and by no means limit the scope of the invention only thereto unless specifically disclosed in particular.

Embodiment

Figure 1:
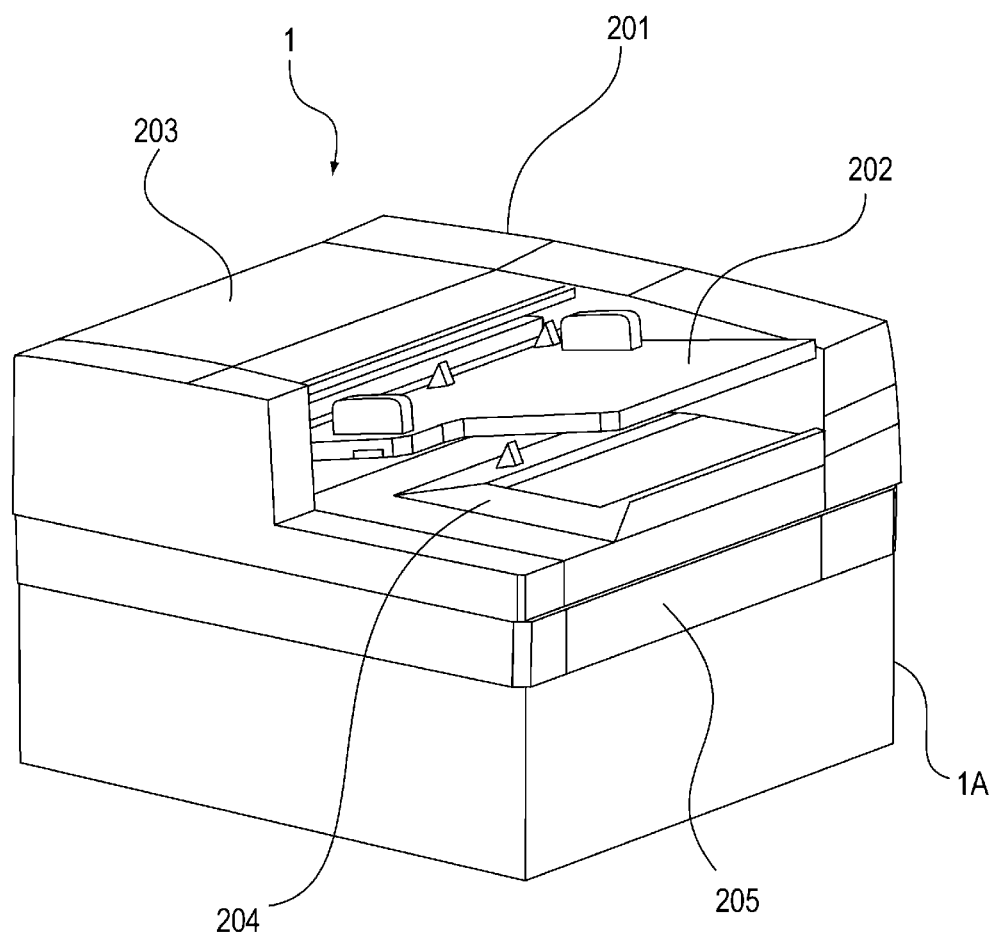
FIG. 1 is a perspective view illustrating a configuration of an image forming apparatus which has an original reading apparatus according to an embodiment of the present invention.

FIG. 1 is a perspective view illustrating a configuration of an image forming apparatus 1 which has an original reading apparatus according to an embodiment of the present invention. The image forming apparatus 1 is, for example, a facsimile apparatus or a copy machine which uses electrophotographic image forming process. As illustrated in FIG. 1, the image forming apparatus 1 has an image forming apparatus body (simply referred to as an "apparatus body") 1A and an image reading apparatus 201 which is arranged on the apparatus body 1A. Inside this apparatus body 1A, a photosensitive drum which serves as an "image bearing member" which is an "image forming portion" which forms an image on a sheet according to image information read by the image reading apparatus 201, and various devices and members for forming an image such as transfer rollers which are a "transfer apparatus" are arranged.

The image reading apparatus 201 has a sheet tray 202 and an automatic document feeder which serves as an "original feeding apparatus" which is an auto original feeding portion which conveys an original taken in from the sheet tray 202. The automatic document feeder is referred to as an "ADF 203" below. The "ADF 203" is an abbreviation of an Auto Document Feeder. Further, the image reading apparatus 201 has an original reading portion 205 which is an original reading portion which reads an original S (see FIG. 2) conveyed by the ADF 203, and a discharge tray 204 which discharges the original S read by the original reading portion 205. Furthermore, a plurality of originals S set on the sheet tray 202 are separated, fed and conveyed by the ADF 203, and are read by the original reading portion 205. Still further, the original S set on an original base plate which is not illustrated is read by the original reading portion 205 as is.

Figure 2:
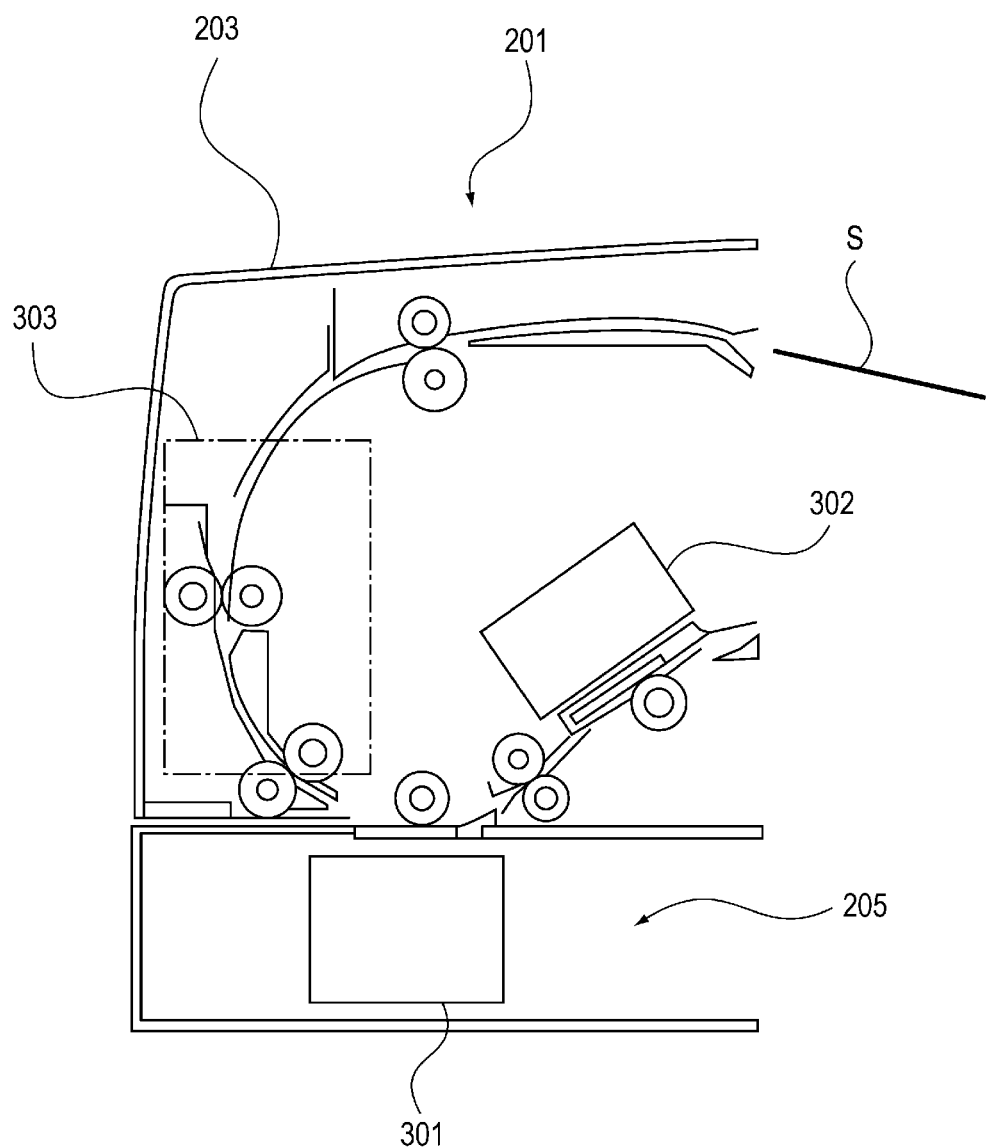
FIG. 2 is a cross-sectional view illustrating a configuration of an image reading apparatus.

FIG. 2 is a cross-sectional view illustrating a configuration of the image reading apparatus 201. In the image reading apparatus 201 illustrated in FIG. 2, while the original S is conveyed by the ADF 203 from the sheet tray 202 (see FIG. 1) and is discharged to the discharge tray 204 (see FIG. 1), the original S is conveyed through a curved route portion 303 by the ADF 203. Further, to read double sides of the original S in particular, an image on a top surface of the original S is read by a first original reading portion 301 which is provided in the original reading portion 205 and which is an "image reading portion" which reads an image on the original S. An image on a back surface of the original S is read by a second original reading portion 302 which is provided closer to a downstream side in an original conveying direction than the first original reading portion 301 and which is an "image reading portion" which reads the image of the original S.

Figure 3:
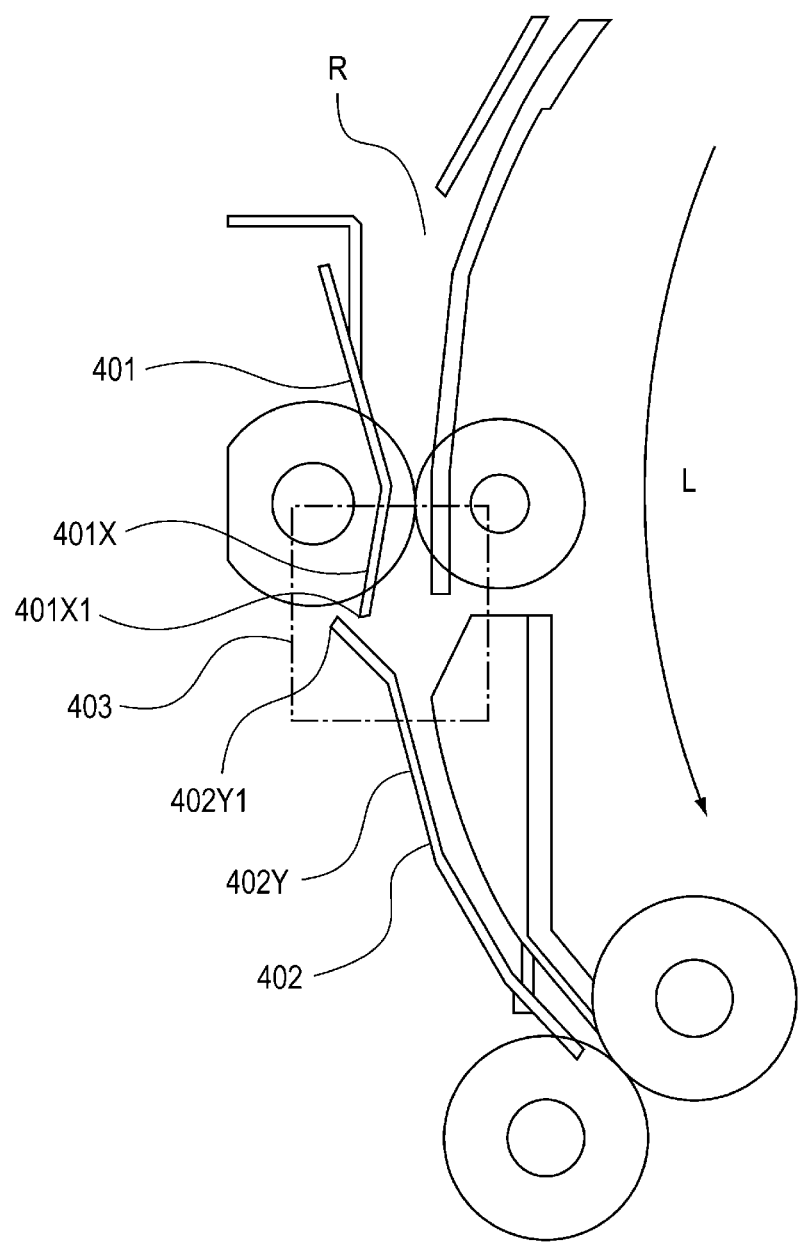
FIG. 3 is an enlarged cross-sectional view illustrating a configuration of a curved route portion.

FIG. 3 is an enlarged cross-sectional view illustrating a configuration of the curved route portion 303. As illustrated in FIG. 3, in the curved route portion 303, a first conveying guide 401 and a second conveying guide 402 are disposed. The first conveying guide 401 is a guide (a guide member which guides the original in a conveying direction) which conveys the original S which is a "sheet". The second conveying guide 402 is a guide (a guide member which guides the original in the conveying direction) which is arranged closer to a downstream side in an original conveying direction L which is a "sheet conveying direction" than the first conveying guide 401, and which conveys the original S. The first conveying guide 401 and the second conveying guide 402 form an original conveying plane J (see FIGS. 7 and 8) which is a "sheet conveying plane" of the original conveying path R which is the "sheet conveying path".

Figure 4:
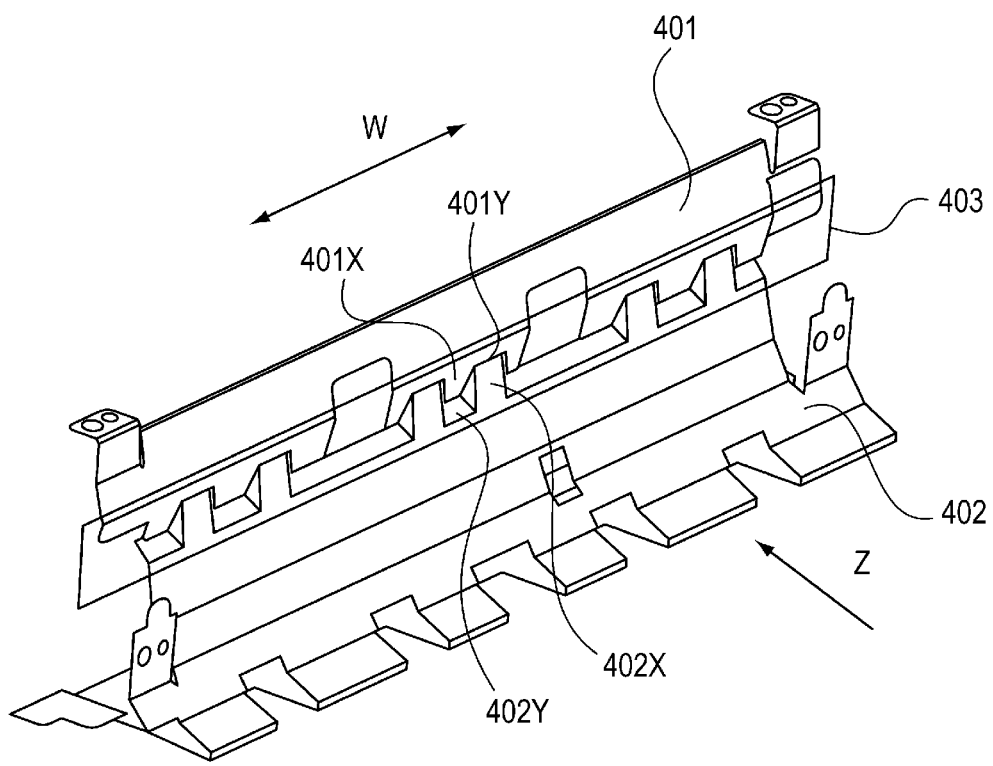
FIG. 4 is a perspective view illustrating configurations of a first conveying guide and a second conveying guide.

FIG. 4 is a perspective view illustrating configurations of the first conveying guide 401 and the second conveying guide 402. The following configuration is employed to pass the original S which is being conveyed between the first conveying guide 401 and the second conveying guide 402 without jamming the original S. That is, the first conveying guide 401 is provided with a first comb 401X and the second conveying guide 402 is provided with a second comb 402X, and these two combs form a comb guide portion 403. The details are as follows. While the original reading portion 205 reads an image of an original to be conveyed, a rear end of the original passes through the first comb 401X and the second comb 402X.

The first comb 401X which is a "first convex portion" is formed on a downstream side of the first conveying guide 401, and extends toward the second conveying guide 402. A first adjacent portion 401Y is formed on the downstream side of the first conveying guide 401, is adjacent to the first comb 401X in an original width direction W which is the "sheet width direction" when seen from a direction Z orthogonal to the original conveying plane J, and extends toward the second conveying guide 402. In addition, the first adjacent portion 401Y is formed by drawing.

A second comb 402X which is a "second convex portion" is formed on an upstream side of the second conveying guide 402, and extends toward the first conveying guide 401. A second adjacent portion 402Y is formed on the upstream side of the second conveying guide 402, is adjacent to the second comb 402X in the original width direction W when seen from the direction Z orthogonal to the original conveying plane J, and extends toward the first conveying guide 401. In addition, the second adjacent portion 402Y is formed by drawing. The second adjacent portion 402Y as a bent portion "an adjacent portion" is bent and formed in a manner such that an upstream end portion 402Y1 of the second adjacent portion 402Y in the sheet conveying direction is apart from the original conveying path. The first adjacent portion 401Y as a second bent portion "an upstream guide adjacent portion" is bent and formed in a manner such that an upstream end portion 401Y1 of the first adjacent portion 401Y in the sheet conveying direction is apart from the original conveying path.

Figure 5:
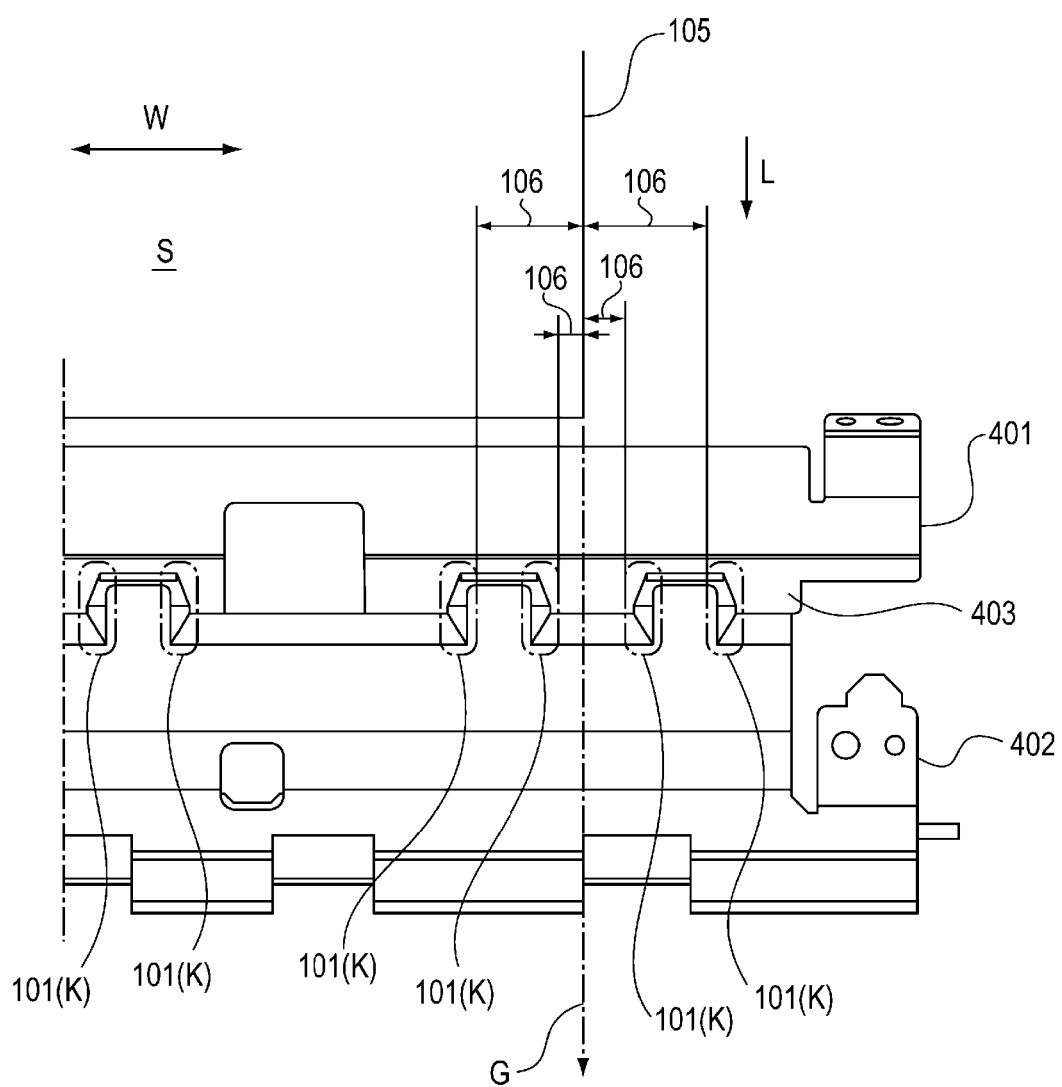
FIG. 5 is a side view illustrating configurations of a first conveying guide, a second conveying guide, a comb guide portion and first edge portions.

FIG. 5 is a side view illustrating configurations of the first conveying guide 401, the second conveying guide 402, the comb guide portion 403 and first edge portions 101. The first comb 401X and the second comb 402X which form the comb guide portion 403 form a plurality of first edge portions 101 in the comb guide portion 403. This first edge portion 101 can also be referred to as a "gap portion K". When an expression of the gap portion K is used, a feature includes that the gap portions K formed between the first comb 401X and the second comb 402X are set to positions off from a passage trajectory G of a lateral end 105 of the original S to be conveyed in the original width direction W. This content will be described in detail below.

Meanwhile, although the ADF 203 is demanded to convey the originals S of various sizes (for example, A5, A4 and A3), the first edge portions 101 are disposed at positions which are predetermined distances 106 apart from lateral edges 105 of all originals S. By disposing the first edge portions 101 in such a manner, it is possible to prevent the first edge portions 101 from contacting the lateral ends 105 of all originals S conveyed by the ADF 203. Consequently, it is possible to prevent a decrease in original conveying performance such as skew feeding caused when the original S is conveyed with the lateral end 105 of the original S contacting the first edge portion 101.

Figure 6:
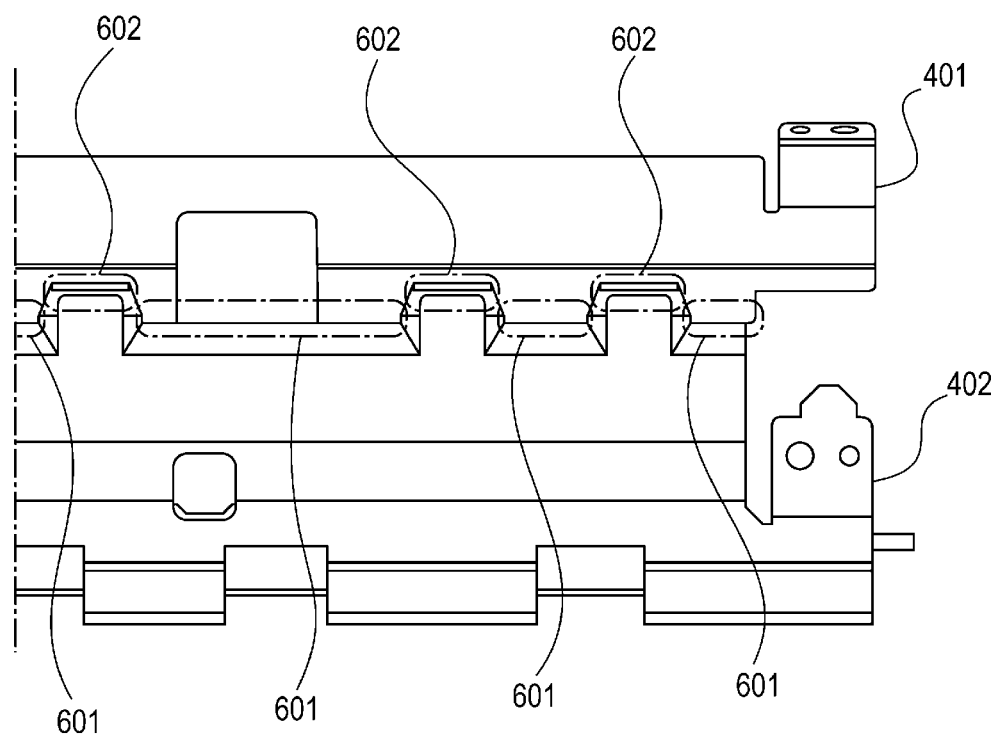
FIG. 6 is a side view illustrating configurations of the first conveying guide, the second conveying guide, second edge portions and third edge portions.

FIG. 6 is a side view illustrating configurations of the first conveying guide 401, the second conveying guide 402, second edge portions 601 and third edge portions 602. As illustrated in FIG. 6, the comb guide portion 403 includes not only the first edge portions 101 but also a plurality of second edge portions 601 and a plurality of third edge portions 602.

Figure 7:
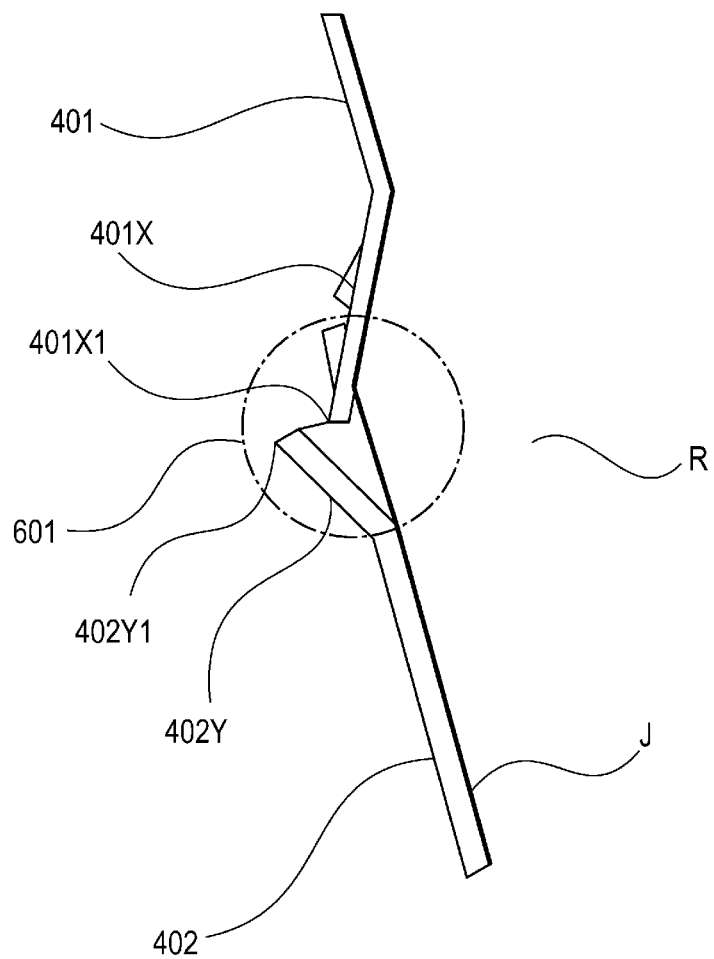
FIG. 7 is a cross-sectional view illustrating an arrangement relationship among the first conveying guide, the second conveying guide, the second edge portion and an original conveying plane.

FIG. 7 is a cross-sectional view illustrating an arrangement relationship among the first conveying guide 401, the second conveying guide 402, the second edge portion 601 and the original conveying plane J. As illustrated in FIG. 7, the downstream end portion 401X1 of the first comb 401X and the upstream end portion 402Y1 of the second adjacent portion 402Y oppose in the original conveying direction L, and are arranged at positions farther apart from the original conveying path R than the original conveying plane J. The second edge portion 601 is formed with the downstream end portion 401X1 and the upstream end portion 402Y1. The original conveying plane J is formed with surfaces of the first conveying guide 401 and the second conveying guide 402. Particularly, the original conveying plane J is formed with a portion (FIG. 7) of the first conveying guide 401 closer to an upstream than the first comb 401X, the first comb 401X (FIG. 7), the second comb 402X (see FIG. 8) and a portion (see FIG. 8) of the second conveying guide 402 closer to a downstream than the second comb 402X.

Further, the first comb 401X is formed to tilt with respect to the entire surface of the first conveying guide 401. The second adjacent portion 402Y is formed to tilt with respect to the entire surface of the second conveying guide 402. The second adjacent portion 402Y is bent and formed such that the position of the upstream end portion 402Y1 of the second adjacent portion 402Y is arranged in a direction farther apart from the original conveying path R than the position of the downstream end portion 401X1 of the first comb 401X. A virtual plane which extends the surface (guide plane) of the first comb 401X toward the downstream in the conveying direction crosses the surface of the second adjacent portion 402Y.

Figure 8:
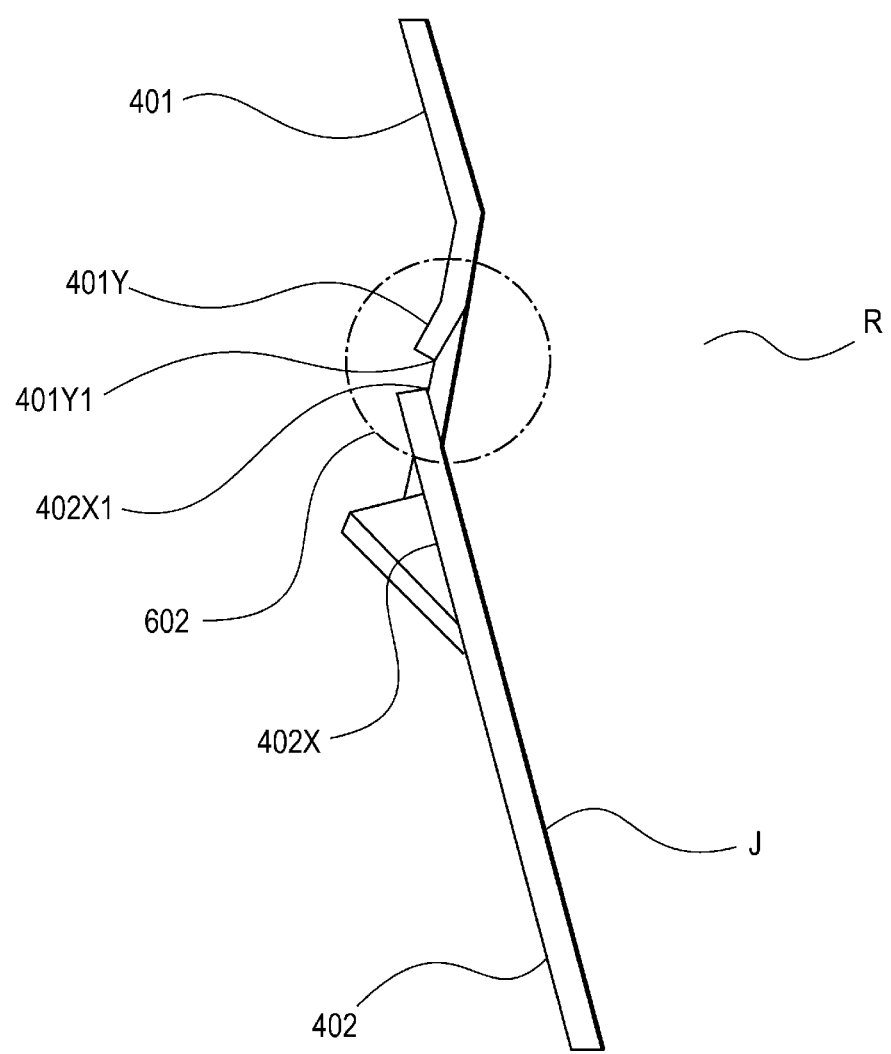
FIG. 8 is a cross-sectional view illustrating an arrangement relationship among the first conveying guide, the second conveying guide, the third edge portion and the original conveying plane.

FIG. 8 is a cross-sectional view illustrating an arrangement relationship among the first conveying guide 401, the second conveying guide 402, the third edge portion 602 and the original conveying plane J. As illustrated in FIG. 8, the downstream end portion 401Y1 of the first adjacent portion 401Y and the upstream end portion 402X1 of the second comb 402X oppose in the original conveying direction L, and are arranged at positions farther apart from the original conveying path R than the original conveying plane J. The first adjacent portion 401Y is bent and formed such that the position of the downstream end portion 401Y1 of the first adjacent portion 401Y is arranged in a direction apart from the original conveying path R. The third edge portion 602 is formed with the upstream end portion 402X1 and the downstream end portion 401Y1.

Further, the first adjacent portion 401Y is formed to tilt with respect to the entire surface of the first conveying guide 401, and the second comb 402X is formed to widen in a direction along the entire surface of the second conveying guide 402. The substantially same dimensions to part from the original conveying path R are set to the position of the downstream end portion 401Y1 of the first adjacent portion 401Y and the position of the upstream end portion 402X1 of the second comb 402X.

Further, as illustrated in FIGS. 7 and 8, the second edge portions 601 and the third edge portions 602 are provided outside the original conveying plane J formed by the first conveying guide 401 and the second conveying guide 402. According to this configuration, when the original S passes on the boundary between the conveying guides (401 and 402) which form the original conveying path R, it is possible to prevent the phenomenon that the front end of the original S contacts "convex portions" and "portions adjacent to the convex portions" (the second edge portions 601 and the third edge portions 602). Moreover, it is possible to prevent image deterioration, a damage such as a scratch on the front end of the original S and skew feeding of the original S.

Particularly, the second adjacent portion 402Y is formed at the upstream end portion of the second conveying guide 402 which opposes to the downstream end portion 401X1 of the first comb 401X. Hence, when the front end of the original S is passed to the second conveying guide 402 after passing the downstream end portion 401X1, the front end of the original S is smoothly guided by the second adjacent portion 402Y without colliding against the upstream end portion 402Y1 of the second conveying guide 402.

Further, a configuration is employed with the present embodiment where both of the second edge portions 601 and the third edge portions 602 are provided outside the original conveying plane J. Hence, when the original S is conveyed in a direction of the original conveying direction L illustrated in FIG. 5, the front end of the original S does not contact the second edge portions 601 and the third edge portions 602. In addition, even when the jammed original S is pulled out by the user or the original S is conveyed in an "opposite direction" to the original conveying direction L (a direction opposite to the original conveying direction L) upon, for example, jam processing, the end portion (rear end) of the original S does not contact the second edge portions 601 and the third edge portions 602.

Particularly, the first adjacent portion 401Y is formed at the downstream end portion of the first conveying guide 401 which opposes to the upstream end portion 402X1 of the second comb 402X. Hence, when the end portion of the original S is passed to the first conveying guide 401 after passing the upstream end portion 402X1 upon jam processing, the end portion of the original S is smoothly guided by the first adjacent portion 401Y without colliding against the upstream end of the first conveying guide 401. Consequently, according to the present embodiment, it is possible to convey the original S in both directions of the original conveying direction L and the direction opposite to the original conveying direction L in the comb guide portion 403, and prevent a damage such as a scratch on the front end of the original S not only upon conveyance of the original S but also upon jam processing.

The present invention prevents a phenomenon that a front end of a sheet contacts convex portions and portions adjacent to the convex portions when the sheet passes on a boundary between conveying guides which form a sheet conveying path.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-085260, filed Apr. 4, 2012, which is hereby incorporated by reference herein in its entirety.

What is claimed is:

1. A sheet conveying apparatus comprising:
   a first conveying guide which guides a sheet;
   a second conveying guide which is arranged on a downstream of the first conveying guide in a sheet conveying direction, guides the sheet and forms a sheet conveying path together with the first conveying guide;
   a plurality of first convex portions which is provided in the first conveying guide, extends toward the second conveying guide and is arranged in a sheet width direction crossing to the sheet conveying direction;
   a plurality of second convex portions which is provided in the second conveying guide, extends toward the first conveying guide and is arranged in the sheet width direction, wherein the first convex portions and the second convex portions are alternately arranged in the sheet width direction; and
   a bent portion which is formed between the plurality of second convex portions in the second conveying guide, and bent in a manner such that an upstream end of the bent portion is arranged at a position farther from the sheet conveying path than a downstream end portions of the first convex portions.

2. The sheet conveying apparatus according to claim 1, further comprising a second bent portion which is formed between the plurality of first convex portions in the first conveying guide, and bent in a manner such that a downstream end of the second bent portion in the sheet conveying direction is apart from the sheet conveying path.

3. The sheet conveying apparatus according to claim 1, wherein a position of a gap portion formed between the first convex portions and the second convex portions is set to a position off from a passage trajectory of a lateral end of the sheet to be conveyed in the sheet width direction.

4. An image reading apparatus comprising:
the sheet conveying apparatus according to claim 1; and
an image reading portion which reads an image of the sheet conveyed by the sheet conveying apparatus.

5. The image reading apparatus according to claim 4, wherein
the sheet conveying path is curved,
the first conveying guide and the second conveying guide are arranged outside the sheet conveying path which is curved, and
the first conveying guide and the second conveying guide are arranged such that a rear end of the sheet passes through the first convex portions and the second convex portions while the image reading portion reads the sheet to be conveyed.

6. An image forming apparatus comprising:
an image forming portion which forms an image on a sheet; and
the image reading apparatus according to claim 5.

7. A sheet conveying apparatus comprising:
a first conveying guide which guides a sheet;
a second conveying guide which is arranged on a downstream of the first conveying guide in a sheet conveying direction, guides the sheet and forms a sheet conveying path together with the first conveying guide and;
a first convex portion which is provided in the first conveying guide, and extends toward the second conveying guide;
a second convex portion which is provided in the second conveying guide, extends toward the first conveying guide and, wherein the first convex portion and the second convex portion are arranged in the sheet width direction; and
an adjacent portion which is provided in the second conveying guide, is adjacent to the second convex portion in the sheet width direction and is arranged such that the position of the adjacent portion in the sheet width direction corresponds to a position of the first convex portion in the sheet width direction,
wherein the adjacent portion extends toward the first conveying guide and is formed such that an upstream end of the second adjacent portion is arranged at a position farther from the sheet conveying path than a downstream end portion of the first convex portion.

8. The sheet conveying apparatus according to claim 7, further comprising:
an upstream guide adjacent portion which is provided to the first conveying guide and is adjacent to the first convex portion in the sheet width direction,
wherein the upstream guide adjacent portion is bent and formed to extend toward the second conveying guide and be arranged such that a downstream end of the first adjacent portion is arranged at a position far from the sheet conveying plane.

9. The sheet conveying apparatus according to claim 7, wherein a position of a gap portion formed between the first convex portion and the second convex portion is set to a position off from a passage trajectory of a lateral end of the sheet to be conveyed in the sheet width direction.

10. A sheet conveying apparatus which includes a first conveying guide which conveys a sheet, and a second conveying guide which is arranged on a downstream of the first conveying guide in a sheet conveying direction, and conveys the sheet, the first conveying guide and the second conveying guide forming a sheet conveying plane of a sheet conveying path, the sheet conveying apparatus comprising:
a first convex portion which is formed in the first conveying guide, and extends toward the second conveying guide;
a first adjacent portion which is formed in the first conveying guide, is adjacent to the first convex portion in a sheet width direction and extends toward the second conveying guide;
a second convex portion which is formed in the second conveying guide, and extends toward the first conveying guide; and
a second adjacent portion which is formed in the second conveying guide, is adjacent to the second convex portion in a sheet width direction and extends toward the first conveying guide,
wherein positions of the first convex portion and the second adjacent portion in a width direction correspond to each other, and a downstream end portion of the first convex portion and an upstream end portion of the second adjacent portion are arranged at positions farther apart from the sheet conveying path than the sheet conveying plane, and the upstream end portion of the second adjacent portion is arranged at a position farther from the sheet conveying path than the downstream end portion of the first convex portion.

11. The sheet conveying apparatus according to claim 10, wherein positions of the second convex portion and the first adjacent portion in the sheet width direction correspond to each other, and a downstream end portion of the first adjacent portion and an upstream end portion of the second convex portion are arranged at positions farther apart from the sheet conveying path than the sheet conveying plane.

12. The sheet conveying apparatus according to claim 10, wherein the first convex portion is formed to tilt with respect to an entire surface of the first conveying guide, and the second adjacent portion is formed to tilt with respect to an entire surface of the second conveying guide.

13. The sheet conveying apparatus according to claim 10, wherein the first adjacent portion is formed to tilt with respect to an entire surface of the first conveying guide, and the second convex portion is formed to widen in a direction along an entire surface of the second conveying guide.

14. The sheet conveying apparatus according to claim 13, wherein substantially same dimensions to part from the sheet conveying path are set to a position of the downstream end portion of the first adjacent portion and a position of the upstream end portion of the second convex portion.

15. The sheet conveying apparatus according to claim 10, wherein a position of a gap portion formed between the first convex portion and the second convex portion is set to a position off from a passage trajectory of a lateral end of the sheet to be conveyed in the sheet width direction.

* * * * *